US009545783B2

United States Patent
Gillard et al.

(10) Patent No.: US 9,545,783 B2
(45) Date of Patent: Jan. 17, 2017

(54) HANDLING OF EPOXY RESINS (71) Applicant: COEXPAIR, Namur (BE)

(72) Inventors: Marc Gillard, Andenne (BE); Andre Bertin, Namur (BE)

(73) Assignee: COEXPAIR, Namur (BE)

( * ) Notice: Subject to any disclaimer, the term of this patent is extended or adjusted under 35 U.S.C. 154(b) by 0 days.

(21) Appl. No.: 14/433,365

(22) PCT Filed: Oct. 3, 2012

(86) PCT No.: PCT/EP2012/069529
§ 371 (c)(1),
(2) Date: Apr. 2, 2015

(87) PCT Pub. No.: WO2014/053173
PCT Pub. Date: Apr. 10, 2014

(65) Prior Publication Data
US 2015/0258766 A1    Sep. 17, 2015

(51) Int. Cl.
*B32B 38/10* (2006.01)
*B32B 43/00* (2006.01)
(Continued)

(52) U.S. Cl.
CPC ............. *B32B 43/006* (2013.01); *B29B 17/02* (2013.01); *B29B 2017/0217* (2013.01);
(Continued)

(58) Field of Classification Search
CPC .. B32B 38/10; B32B 43/006; Y10T 156/1126; Y10T 156/1153; Y10T 156/1168; Y10T 156/1174; Y10T 156/1195; Y10T 156/1911; Y10T 156/1928; Y10T 156/1933; Y10T 156/195; Y10T 156/1978; Y10T 156/1994
(Continued)

(56) References Cited

U.S. PATENT DOCUMENTS 4,282,056 A * 8/1981 Okui .................... B26D 7/1827
118/37
5,788,811 A * 8/1998 Yamamoto .............. B29B 17/02
156/389
(Continued)

FOREIGN PATENT DOCUMENTS

CN        201169020 Y    12/2008
DE    102010017070 A1    12/2011
(Continued)

OTHER PUBLICATIONS

International Search Report for PCT/EP2012/069529 mailed Jun. 3, 2013.
(Continued)

*Primary Examiner* — Mark A Osele
*Assistant Examiner* — Nickolas Harm
(74) *Attorney, Agent, or Firm* — Koppel, Patrick, Heybl & Philpott (57) ABSTRACT

Described herein is an apparatus and a method for removing an epoxy resin from a backing sheet at a temperature at or below the glass transition temperature of the epoxy resin. The apparatus (200) comprises a housing (210) in which is mounted a dispensing roll (220) comprising epoxy resin (230) on a backing sheet (240), a wind-up roll (250) comprising the backing sheet (240), a release element (260) over which the backing sheet (240) is directed, and a collection tray (270) for collecting pieces of resin (230*a*) removed from the backing sheet (240). The dispensing and wind-up rolls (220, 250) are mounted on respective drive shafts (225, 255) which are driven by a drive mechanism (285) controlled by a controller (280). A temperature controller (290) is also provided for controlling the temperature within the housing (210) so that it remains below or at the glass transition temperature of the epoxy resin. Angle (α*a*) is chosen to optimize the peel-back angle of the backing sheet (Continued)

(240) after is passes over the release element (260) in relation to the relative spacing between the dispensing and wind-up rolls (220, 250) and the release element (260).

23 Claims, 4 Drawing Sheets

(51) Int. Cl.
*B29B 17/02* (2006.01)
*B29K 63/00* (2006.01)

(52) U.S. Cl.
CPC ... *B29B 2017/0255* (2013.01); *B29K 2063/00* (2013.01); *B32B 38/10* (2013.01); *B32B 2363/00* (2013.01); *Y02W 30/622* (2015.05); *Y10T 156/1126* (2015.01); *Y10T 156/1153* (2015.01); *Y10T 156/1168* (2015.01); *Y10T 156/1174* (2015.01); *Y10T 156/1195* (2015.01); *Y10T 156/195* (2015.01); *Y10T 156/1911* (2015.01); *Y10T 156/1928* (2015.01); *Y10T 156/1933* (2015.01); *Y10T 156/1978* (2015.01); *Y10T 156/1994* (2015.01)

(58) Field of Classification Search
USPC ............... 156/706, 711, 715, 719, 752, 755, 756,156/759, 760, 764, 767
See application file for complete search history.

(56) References Cited

U.S. PATENT DOCUMENTS

| | | | | |
|---|---|---|---|---|
| 6,128,464 | A * | 10/2000 | Taniguchi | B41M 7/0009 15/102 |
| 6,296,034 | B1 * | 10/2001 | Kodera | B41M 7/0009 101/423 |
| 2006/0204302 | A1 * | 9/2006 | Murakami | G03G 21/00 399/411 |
| 2008/0113486 | A1 * | 5/2008 | Eguchi | B32B 43/006 438/458 |
| 2009/0120579 | A1 * | 5/2009 | Miyasaka | B07B 13/00 156/711 |
| 2010/0243160 | A1 * | 9/2010 | Nakano | B41M 5/506 156/711 |

FOREIGN PATENT DOCUMENTS

| | | |
|---|---|---|
| JP | 2000 025041 A | 1/2000 |
| JP | 2001 179741 A | 7/2001 |
| WO | WO 2011/033309 A2 | 3/2011 |

OTHER PUBLICATIONS

Written Opinion of the International Searching Authority for PCT/EP2012/069529.

* cited by examiner

HANDLING OF EPOXY RESINS

FIELD OF THE INVENTION

The present invention relates to the handling of epoxy resins, and is more particularly concerned with their removal from a carrier layer or backing sheet.

BACKGROUND TO THE INVENTION

Epoxy resin is widely used in many industries. Within the aerospace industry, such resins are categorised as being self-reactive products and their transportation is categorised as "Class 4". By the term "self-reactive" is meant that the resin ages, degrades and/or sets when it is above a certain mass or volume. This means that only a limited quantity of material is allowed to be transported in a single drum which typically contains a maximum of 10 kg of the resin. Moreover, during transportation, the resin needs to be refrigerated to around −18° C. to reduce the risk of reaction and to ensure conservation of the resin. The transportation of such Class 4 products is expensive.

Some epoxy resin manufacturers have developed two-component epoxy resins to overcome the transportation issue. Each component of such two-component epoxy resins is not self-reactive alone and is therefore easier to transport in larger quantities, that is, greater than 10 kg.

However, for a same qualified resin transfer moulding (SQRTM) process, only a small quantity of resin is required to apply pressure to a part during the moulding process. SQRTM is a closed moulding process that combines pre-form processing and liquid moulding to produce an autoclave-quality part without the need for an autoclave that is suitable for use in aerospace parts. The pre-form has already been shaped and impregnated with resin prior to insertion into the mould. Once the mould is closed, only a small additional quantity of resin needs to be injected around the part in order to exert the hydrostatic pressure that is necessary to consolidate the pre-form in the mould and eliminate any gas bubbles that may form during the setting of the resin.

Epoxy resins can be coated as a film onto a backing sheet, for example, silicone-coated paper, and the epoxy-coated backing sheet is then rolled up onto a cylindrical former to form a roll. The presence of the backing sheet or paper reduces the self-reactivity of the roll and transportation of such a roll is not categorised as being Class 4. However, the roll still needs to be refrigerated to around −18° C. to reduce the risk of reaction and to ensure conservation of the resin. Typically, epoxy resins have a life of around 15 days at room temperature and a life of 6 months when stored at −18° C. For SQRTM, it is important that the resin is not close to the end of its life when it is to be injected so that it does not react prematurely, for example, setting in feed passages, resulting in a sub-standard part.

Having coated the resin as a film onto a backing sheet such as silicone-coated paper and rolled the backing sheet and resin film into a roll for transportation, the resin needs to be removed from the backing sheet so that it can be used. The resin can be removed from its backing sheet in many ways, but the effective life of the resin may be reduced. In U.S. Pat. No. 5,807,480, apparatus for peeling and removing a coated film on a resin product is described. A shearing device is used for shearing and removing protruding portions of the resin product from a coated film. A pair of rollers having different effective rotational speeds is used to create a shear stress between the coated film and resin product to effect removal of the resin product from the coated film.

In WO-A-2011/033309, resin residue removal from a backing sheet is described so that the backing sheet can be re-used. A non-contact heat source is directed towards the backing sheet so that any residual resin is heated to reduce its viscosity so that the residue can be removed from the backing sheet.

However, the process described in U.S. Pat. No. 5,807,480 is not efficient as resin residue may remain on the coated film and the resin degrades due to being substantially at room temperature. The process described in WO-A-2011/033309 degrades the residual resin as it requires the resin to be heated for removal from the backing sheet.

SUMMARY OF THE INVENTION

It is therefore an object of the present invention to provide apparatus for removing an epoxy resin from a backing sheet which does not degrade epoxy resin.

It is another object of the present invention to provide a method for removing an epoxy resin from a backing sheet.

In accordance with a first aspect of the present invention, there is provided a method of removing epoxy resin from a backing sheet, the method comprising the steps of:

a) peeling back the backing sheet from the epoxy resin over a release element; and b) collecting the epoxy resin adjacent the release element;

characterised in that the method further comprises adjusting the temperature of the epoxy resin to be at a temperature below the glass transition temperature of the epoxy resin;

and in that step a) comprises peeling the backing sheet through a peel-back angle up to 180°.

The combination of the use of a temperature below the glass transition temperature of the epoxy resin and the peel-back angle enables the brittle epoxy resin to be readily separated from its backing sheet. This is because the backing sheet remains supple and can be directed through the peel-back angle whilst the brittleness of the epoxy resin causes it to fall away from the sheet.

The step of adjusting the temperature of the epoxy resin to be at a temperature below the glass transition temperature of the epoxy resin may comprises blowing cold gas on the epoxy resin to cool it down just before it reaches the peel-back angle. The cold gas may comprise carbon dioxide at −80° C.

Alternatively, the step of adjusting the temperature of the epoxy resin to be at a temperature below the glass transition temperature of the epoxy resin may comprise applying a liquefied gas to the epoxy resin to cool it down just before it reaches the peel-back angle. The liquefied gas may comprise liquefied air.

Step b) may further comprise the step of weighing the epoxy resin collected.

Step a) may further comprise dispensing the epoxy resin and its backing sheet from a roll, the backing sheet being in contact with the release element. In this case, the method further comprises the step of winding up the backing sheet after peel-back.

In one embodiment, at least one of the steps of: dispensing the epoxy resin and its backing sheet from a roll; and winding up the backing sheet after removal of the epoxy resin is automated.

The method may further comprise the step of applying a vacuum during removal of the epoxy resin from the backing sheet.

In one embodiment, the method further comprises the step of scraping residual epoxy resin from the backing sheet.

It is preferred that the release element is grounded to prevent the build-up of static electricity.

The peel-back angle may be in a range between 45° and 180°. Preferred ranges include 60° to 180°, 75° to 180°, 90° to 180°; 105° to 180°, 120° to 180°, 135° to 180°, and 150° to 180°. However, the peel-back angle should be as large as possible and therefore peel-back angles in the ranges between 165° and 180° or between 175° and 180° are most preferred.

In accordance with another aspect of the present invention, there is provided apparatus for removing epoxy resin from a backing sheet, the apparatus comprising:— a housing;

a dispensing shaft on which a roll of epoxy resin coated backing sheet is mountable;

a wind-up shaft on which a roll of backing sheet can be formed; and a collection tray;

characterised in that the apparatus further comprises a release element for acting on the backing sheet to release the epoxy resin; the dispensing shaft, the wind-up shaft and the release element being arranged to provide a peel-back angle up to 180°;

and in that the apparatus further comprises temperature control means for cooling the epoxy resin below its glass transition temperature.

In one embodiment, the temperature control means maintains the temperature within the housing below the glass transition temperature of the epoxy resin.

In an alternative embodiment, the temperature control means comprises a cooling gas at a temperature below the glass transition temperature of the epoxy resin. Alternatively, a liquefied gas may be applied to the epoxy resin to take its temperature below its glass transition temperature.

In the alternative embodiments, the cooling gas or liquefied gas provides localised temperature control for the epoxy resin within the housing instead of cooling the entire housing.

The apparatus may further comprise a drive mechanism for driving at least one of the dispensing shaft and the wind-up shaft. In one embodiment, the dispensing shaft and the wind-up shaft are driven in the same direction. In another embodiment, the dispensing shaft and the wind-up shaft are driven in opposite directions.

The drive mechanism may be automated. However, in one embodiment, the drive mechanism may be manually operated.

At least one removal element may be located adjacent the release element. This has the advantage of removing any residual epoxy resin from the backing sheet.

A vacuum pump for applying a vacuum to the interior of the housing may be used. This assists with the collection of chips of epoxy resin.

The apparatus may further comprise a balance for determining the weight of the collection tray.

BRIEF DESCRIPTION OF THE DRAWINGS

For a better understanding of the present invention, reference will now be made, by way of example only, to the accompanying drawings in which:—

FIGS. 2 to 6 illustrate schematic views of other possible configurations that can be used in the embodiments of FIGS. 1 and 2.

DESCRIPTION OF THE INVENTION

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

The present invention relates to separating epoxy resin from a backing sheet without heating to conserve the life of the resin. As described above, epoxy resins can be coated as a film onto a backing sheet, for example, made of silicone-coated paper, and then rolled up to form a roll for transportation and storage. Epoxy resins degrade or age when stored at room temperatures but can be conserved by refrigeration until ready for use. The apparatus and method of the present invention utilises the glass transition temperature of the epoxy resin during removal of the resin from its backing sheet.

The glass transition temperature of a polymer, for example, an epoxy resin, defines a change in behaviour of the material. Above the glass transition temperature, the polymer tends to be viscous and more rubber-like, and below the glass transition temperature, the polymer is brittle. This behaviour can be understood in terms of the structure of "glassy" materials which are formed typically by substances containing long chains, networks of linked atoms or those that possess a complex molecular structure. Normally, such materials have a high viscosity in the liquid state. When rapid cooling occurs to a temperature at which a crystalline state is expected to be, the more stable, molecular movement is too sluggish or the geometry too awkward to take up a crystalline formation. Therefore, the random arrangement characteristic of the liquid persists down to temperatures at which the viscosity is so high that the material is considered to be solid. The term "glassy" has come to be synonymous with a persistent non-equilibrium state.

Figure 1:
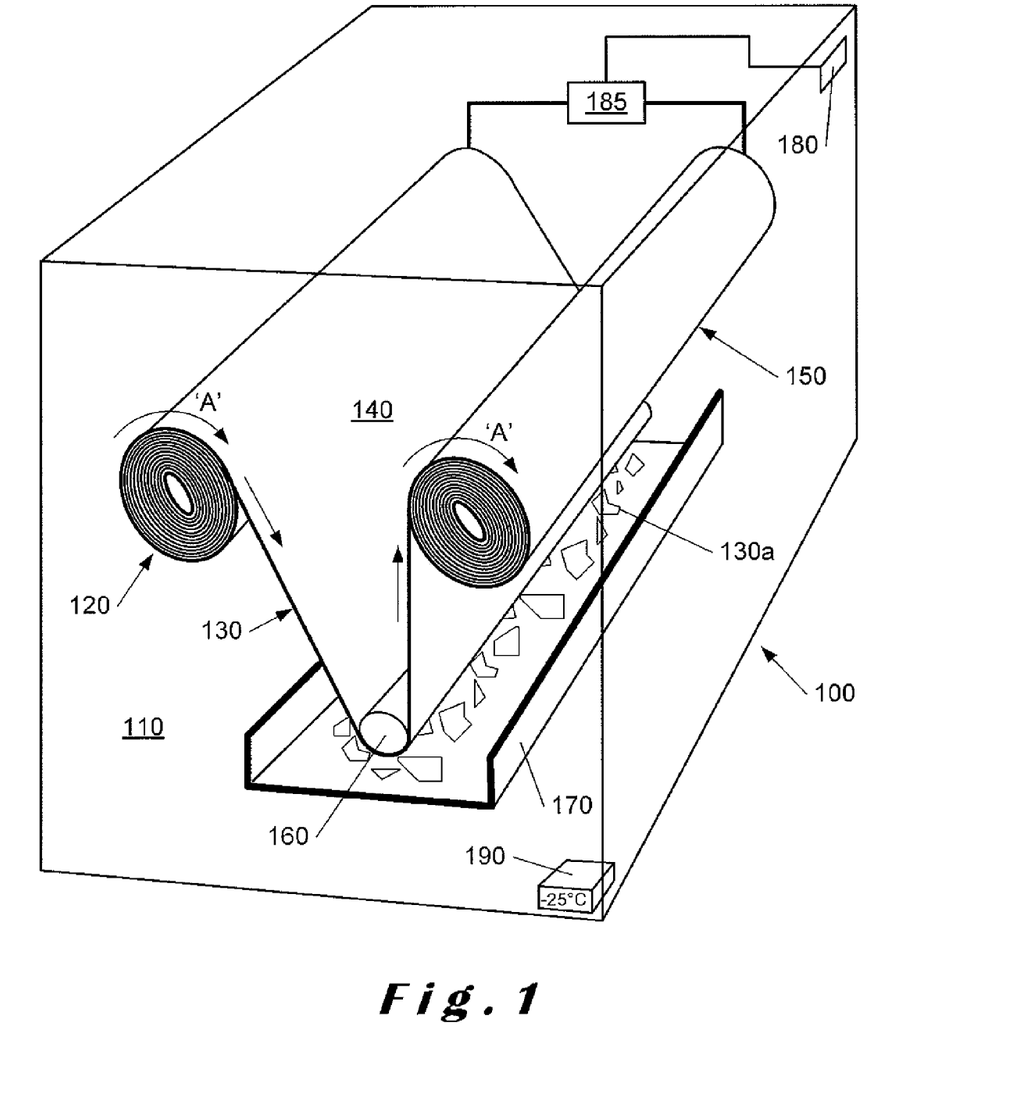
FIG. 1 illustrates a schematic perspective view of one embodiment of apparatus according to the present invention.

Referring now to FIG. 1, a schematic perspective view of a first embodiment of an apparatus 100 in accordance with the present invention is shown. The apparatus 100 comprises a housing 110 in which is mounted a dispensing roll 120 comprising epoxy resin 130 coated onto a backing sheet 140. The epoxy resin 130 may be coated onto the backing sheet 140 as a thin film, for example, 50 μm. A wind-up roll 150 receives the backing sheet 140 after the epoxy resin 130 has been removed by passing around a release element 160, the release element 160 being in contact with the backing sheet 140 and not the epoxy resin 130. As shown, a collection tray 170 is provided for collecting epoxy resin 130a after it has been removed from the backing sheet 140. The apparatus 100 also comprises a controller 180 for controlling a drive mechanism 185 to drive at least one of the dispensing roll 120 and the wind-up roll 150 at a predetermined speed. In one embodiment, both the dispensing roll 120 and the wind-up roll 150 are driven at the same speed. A temperature controller 190 is also provided for maintaining the temperature within the housing 100 of the apparatus 100 below the glass transition temperature of the epoxy resin 130, for example, at −25° C.

It will be appreciated that the temperature within the housing 110 can be controlled by suitable known refrigeration equipment capable of attaining temperatures of −25° C., and such equipment will not be described in detail here.

As alternative to having the entire temperature within the housing 110 at a temperature of −25° C., a cold or cooling gas may be blown onto the surface of the resin before it reaches the peel-back angle to cool it down locally. An example of a cold or cooling gas is carbon dioxide at −80° C. However, other inert cold or cooling gases may be used. Alternatively, liquefied air can be applied to the resin to cool it down. Moreover, other inert liquefied gases can also be used, for example, liquid nitrogen.

By the term "inert" as used herein refers to the gas or liquefied gas not interacting with the epoxy resin so that its properties are altered and have a subsequent effect on the moulding properties of the epoxy resin.

It is also possible that a combination of a temperature-controlled housing and locally applied cooling, such as, a cooling gas or liquefied gas, may be used. In this case, the temperature within the housing does not need to be so rigidly controlled at low temperatures as the epoxy resin is taken below its glass transition temperature by the locally applied cooling.

In operation, the drive mechanism 185 rotates a drive shaft (not shown) on which the dispensing roll 120 is mounted and a further drive shaft (also not shown) on which the wind-up roll 150 is mounted to feed the resin 130 on its backing sheet 140 around the release element 160. In this embodiment, both the dispensing roll 120 and the wind-up roll 150 are driven in the same direction, that is, in a clockwise direction as shown by arrow 'A'. At the release element 160, the backing sheet 140 is directed through a peel-back angle over the release element 160 but the resin 130 cannot bend with the backing sheet 140 due to it being at a temperature below its glass transition temperature and, due to its brittleness, falls off the backing sheet 140 and into the collection tray 170 breaking into pieces 130a. After passing over the release element 160, the backing sheet 140 (without the resin 130) is wound onto the wind-up roll 150. The backing sheet 140 on the wind-up roll 150 may be re-used for coating another epoxy resin film provided it no longer carries any of the previously coated resin.

In the embodiment shown in FIG. 1, the release element 160 is shown as a cylinder having a circular cross-section but it can be any suitable shape to enable the backing sheet 140 to have a transition that causes the resin 130 to fall off as pieces 130a in the collecting tray 170. As shown, the backing sheet 140 after the release element 160 is at an angle with respect to the backing sheet 140 and epoxy resin 130 before the release element 160. This will be described in more detail below with reference to FIGS. 2 to 6.

The epoxy resin 130a collected in the collecting tray 170 is then transferred either directly to injection moulding equipment or to another intermediate container before being transferred to the injection moulding equipment. The collecting tray 170 may be mounted on a balance or other weighing system (not shown) so that the weight of epoxy resin 130a collected can be determined, and, when sufficient epoxy resin 130a has been removed for injection moulding, the removal of epoxy resin 130 from the backing sheet 140 can be suspended.

Ideally, the apparatus is fully automated so that the only user intervention is to mount the dispensing roll 120 and to feed a leader portion (not shown) of the backing sheet 140 over the release element 160 and onto the wind-up roll 150. Once the leader portion is in place, the housing 110 is sealed and the temperature inside the housing 110 is reduced to a temperature below the glass transition temperature of the particular epoxy resin. Once the inside of the housing 110 has reached the desired temperature in accordance with the temperature controller 190, the controller 180 operates the drive mechanism 180 to rotate the drive shafts of the dispensing and wind-up rolls 120, 150 and to draw the backing sheet 140 with epoxy resin 130 from the dispensing roll 120 to the release element 160. At the release element 160, the backing sheet 140 is peeled away from the brittle epoxy resin 130 through the peel-back angle. The brittle epoxy resin 130 breaks and falls into the collecting tray 170. The backing sheet 140 is rolled onto the wind-up roll 150. Once the desired weight of epoxy resin 130a has been collected in the collecting tray 170, it can be removed and transferred for use in injection moulding equipment, such as, equipment used for SQRTM as described above.

Although it is preferred that the apparatus be fully automated, it is possible that the unrolling of the dispensing roll 120 and/or the rolling up of the wind-up roll 150 may be performed manually using a suitable manual device, for example, a handle connected to one or both of the shafts on which the dispensing and wind-up rolls 120, 150 are mounted. If only one of the rolls is manually operated by a handle, for example, the other could be connected through suitable gearing or other drive mechanism to transfer the drive from one roll to both rolls.

It may be desirable to have a removal element or blade (not shown) located adjacent the release element 160 to assist in the separation of the epoxy resin from the backing sheet. Alternatively or additionally, a further removal element or blade (also not shown) may be used for the removal any remaining epoxy resin on the backing sheet 140 before it is wound onto the wind-up roll 150. Further removal elements or blades may be located at any suitable location which enables chips of epoxy resin remaining on the backing sheet 140 after passing over the release element 160 to be removed, that is, scraped off, and collected by the collecting tray 170. If additional removal elements or blades are implemented (not shown), these elements or blades are grounded to avoid the build-up of static electricity and the adherence of very thin chips of resin to the elements or blades and the backing sheet 140. In one embodiment, the inside of the housing 110 may additionally be subjected to a vacuum to assist with the collection of thin chips of epoxy resin.

The removal element or blade used may take different forms, for example, a scraper element, a brush element or the like.

Figure 2:
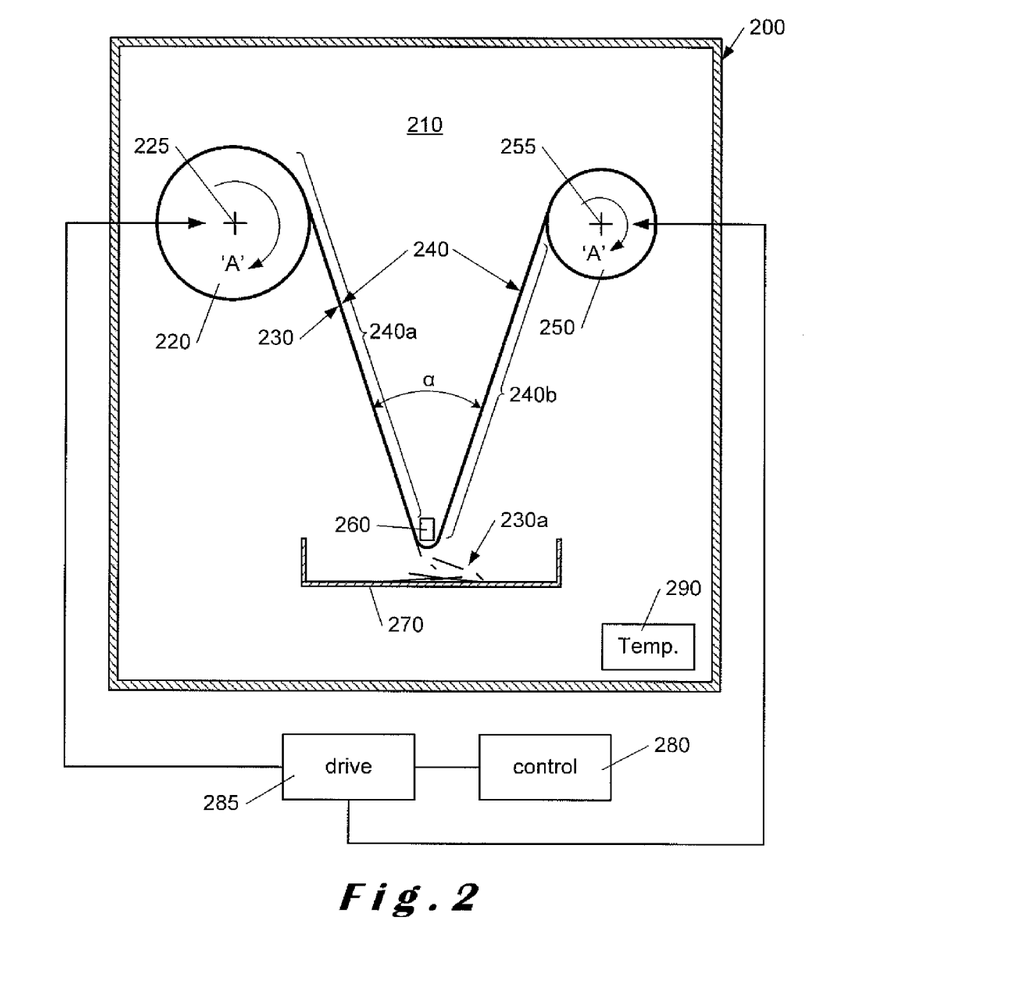
FIG. 2 illustrates a schematic side view of another embodiment of apparatus in accordance with the present invention.

FIG. 2 is similar to FIG. 1 but illustrates a schematic side view of a second embodiment of the apparatus in accordance with the present invention. Operation of the apparatus shown in FIG. 2 is the same as the operation of apparatus 100 shown in FIG. 1, and will not be described again.

In FIG. 2, apparatus 200 comprises a housing 210, a dispensing roll 220 mounted on a shaft 225, a wind-up roll 250 mounted on a shaft 255, a release element 260 and a collecting tray 270. As before, the shafts 225, 255 are controlled by a drive mechanism 285 under the control of a controller 280. A temperature controller 290 is also provided.

The dispensing roll 220 comprises a roll formed from a backing sheet 240 on which is coated a thin film of epoxy resin 230 with the wind-up roll 250 comprising a roll of backing sheet 240 after the epoxy resin 230 has been removed as pieces 230a at the release element 260. Again, both the dispensing roll 220 and the wind-up roll 250 are driven in the same direction, that is, a clockwise direction as indicated by arrow 'A'.

The release element 260 is in contact with the backing sheet 240 and not the epoxy resin 230 and comprises a bar of rectangular cross-section which defines a point which: a) divides the backing sheet 240 into a first portion 240*a* carrying the epoxy resin 230 and a second portion 240*b* which no longer carries the epoxy resin 230; and b) about which the second portion 240*b* of the backing sheet 240 forms an angle α with respect to the first portion 240*a* of the backing sheet 240 at a particular point in time. This means that the backing sheet 240 moves through a peel-back angle of (180−α) around the release element 260.

It will be appreciated that, as the dispensing roll 220 and the wind-up roll 250 are driven on their respective shafts 225, 255 by the drive mechanism 285, the first and second portions 240*a*, 240*b* are transient during the transfer of the backing sheet 240 from the dispensing roll 220 to the wind-up roll 250. The angle α is determined by the spacing between the respective shafts 225, 255 of the dispensing and receiving rolls 220, 250 in a substantially horizontal plane regardless of the vertical spacing therebetween, and the relative position of the release element 260.

FIGS. 3 to 6 are schematic illustrations of different configurations of the dispensing roll, wind-up roll and release element that can be implemented in the embodiments of the apparatus 100, 200 as described above with reference to FIGS. 1 and 2. It will be appreciated that these configurations are examples only, and that other configurations are also possible.

Figure 3:
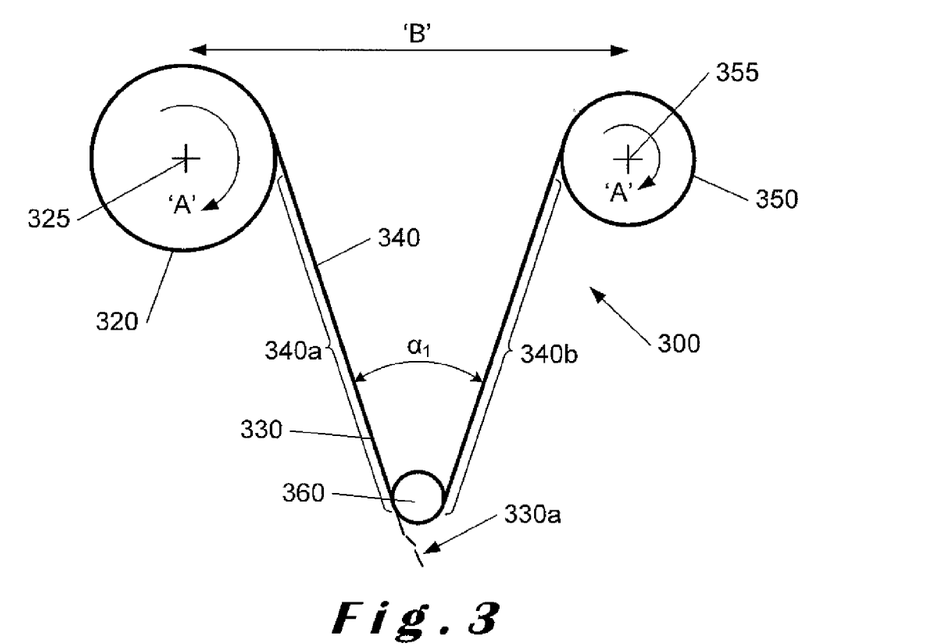

In FIG. 3, a configuration 300 is similar to that shown in the apparatus 100 of FIG. 1. Dispensing roll 320 and wind-up roll 350 are mounted on respective drive shafts 325, 355 as shown with a release element 360 arranged between the positions of the two drive shafts 325, 355. Angle $\alpha_1$ is directly related to the distance 'B' in a horizontal plane between the two drive shafts 325, 355 and the shape (and location with respect to the drive shafts 325, 355) of the release element 360.

As before, the release element 360 defines first and second portions 340*a*, 340*b* of backing sheet 340 where epoxy resin 330 is present and where it has been removed (as shown by resin chips 330*a*) on peel-back of the backing sheet 340 respectively.

Figure 4:
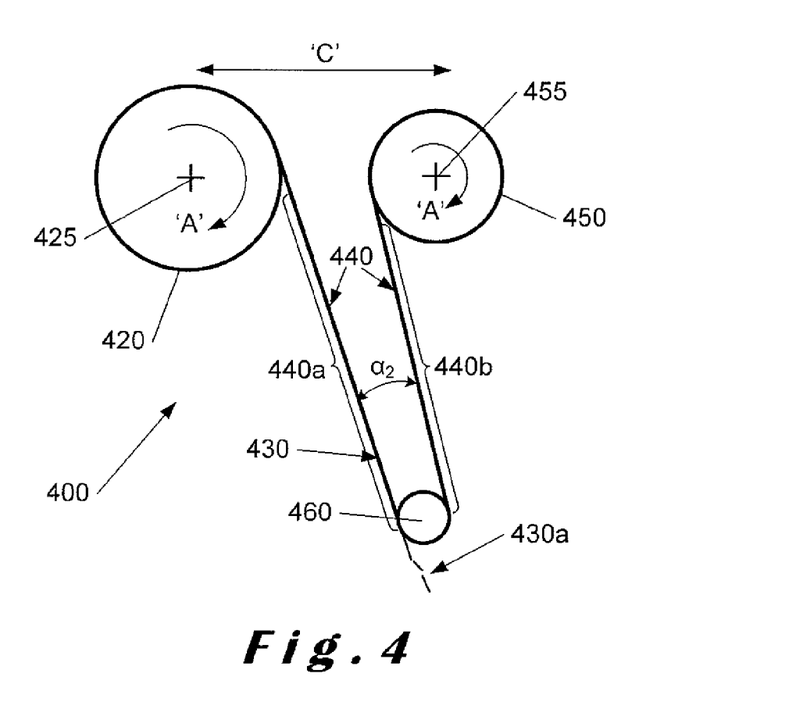

As shown in FIG. 4, arrangement 400 is such that drive shafts 425, 455 of respective dispensing and wind-up rolls 420, 450 are closer together, as indicated by distance 'C' (where C<B), but release element 460 is the same as release element 360 in FIG. 3. As can readily be seen, angle $\alpha_2$ is smaller than angle α of FIG. 3 and therefore the peel-back angle (180−$\alpha_2$) through which the backing sheet 440 moves is greater that the peel-back angle (180−$\alpha_1$) through which the backing sheet 340 moves in FIG. 3. As before, both drive shafts 425, 455 are driven in a clockwise direction as indicated by arrow 'A'.

As before, the release element 460 defines first and second portions 440*a*, 440*b* of backing sheet 440 where epoxy resin 430 is present and where it has been removed (as shown by resin chips 430*a*) on peel-back of the backing sheet 440 respectively.

Figure 5:
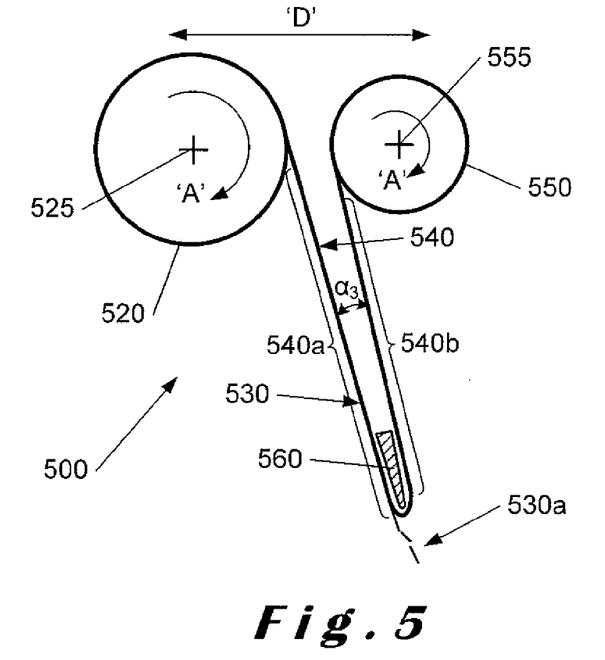

In FIG. 5, arrangement 500 is such that drive shafts 525, 555 of respective dispensing and wind-up rolls 520, 550 are even closer together, as indicated by distance 'D' (where D<C<B), but release element 560 takes the form of a blade. Here, angle $\alpha_3$ is smaller than angle $\alpha_2$ of FIG. 4 and therefore the peel-back angle (180−$\alpha_3$) through which the backing sheet 540 moves is greater than the peel-back angle (180−$\alpha_2$) through which the backing sheet 440 moves in FIG. 4. As before, both drive shafts 525, 555 are driven in a clockwise direction as indicated by arrow 'A'.

As before, the release element 560 defines first and second portions 540*a*, 540*b* of backing sheet 540 where epoxy resin 530 is present and where it has been removed (as shown by resin chips 530*a*) on peel-back of the backing sheet 540 respectively.

Figure 6:
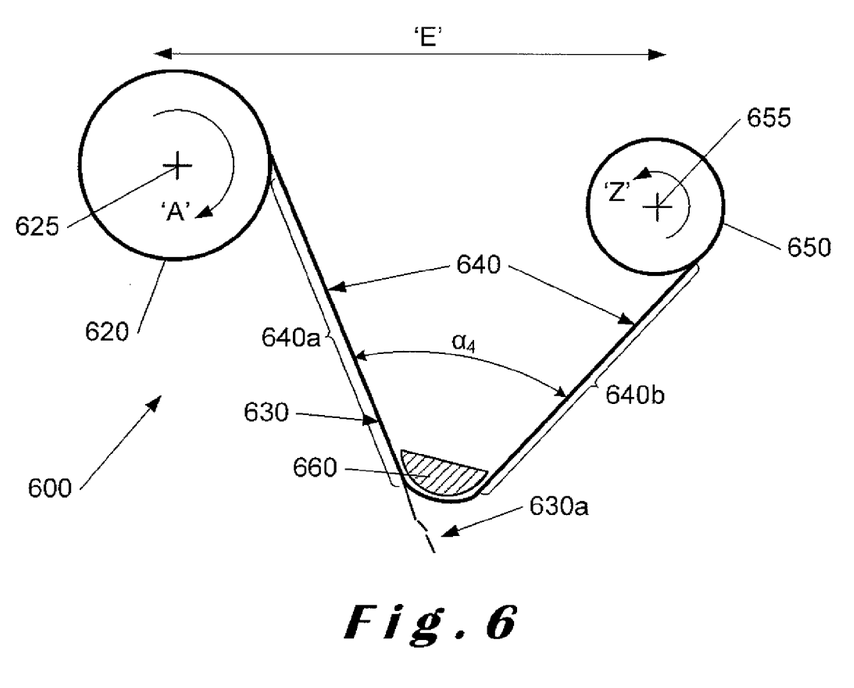

In FIG. 6, arrangement 600 is such that drive shafts 625, 655 of respective dispensing and wind-up rolls 620, 650 are spaced apart a distance 'E' where E is greater than B, C or D. Release element 660 takes the form of a segment and angle $\alpha_4$ is greater than each of angles $\alpha_3$, $\alpha_2$, $\alpha_1$ and α, and as a result, the backing sheet 640 moves through an angle that is smaller than the backing sheets 240, 340, 440, 540 shown in FIGS. 2 to 5 respectively, around release element 660. Here, dispensing roll 620 is driven in a clockwise direction, as indicated by arrow 'A', and wind-up roll 650 is driven in an anticlockwise direction as indicated by arrow 'Z'.

As before, the release element 660 defines first and second portions 640*a*, 640*b* of backing sheet 640 where epoxy resin 630 is present and where it has been removed (as shown by resin chips 630*a*) on peel-back of the backing sheet 640 respectively.

The range of the angle "a" (which also includes $\alpha_1$, $\alpha_2$, $\alpha_3$ and $\alpha_4$) is chosen to ensure that the epoxy resin below its glass transition temperature can be separated from its backing sheet by peeling the backing sheet away around the release element at a suitable peel-back angle. Angle α may have a value between 0° and 135° so that the peel-back angle is between 180° and 45°. Preferred values for a may fall within the following ranges: between 0° and 135°; 0° and 120°; 0° and 105°; 0° and 90°; 0° and 75°; between 0° and 60°; between 0° and 45°; between 0° and 30°; between 0° and 15°; and between 0° and 5°. Such ranges of angles for α result in the backing sheet moving through varying ranges of peel-back angles between 180° and 45°; 180° and 60°; 180° and 75°; 180° and 90°; 180° and 105°; 180° and 120°; 180° and 135°; 180° and 150°; 180° and 165°; and 180° and 175° respectively. It will be appreciated that the greater the peel-back angle through which the backing sheet moves around the release element, the easier it will be to remove the backing sheet from the epoxy resin. This is because the backing sheet remains supple at the chosen temperature below the glass transition temperature of the epoxy resin whilst the epoxy resin is brittle and cannot change direction with the backing sheet. This inability to change direction around the release member causes the brittle epoxy resin to detach from the backing sheet and fall into the collection tray.

It will be appreciated that although static positions are shown in the Figures, the diameter of the wind-up roll will increase as the diameter of the dispensing roll decreases. Whilst the angular position of the backing sheet and backing sheet, together with epoxy resin, will change as the epoxy resin is removed from its backing sheet, it will be appreciated that this change in angular position will result in a small overall change, if any, in the angle α, and hence the peel-back angle.

In the Figures, different release elements are shown. It will be appreciated that if the release element has a circular cross-section, its diameter needs to be as small as possible to be able to provide a suitable peel-back angle when considered in relation to its spacing relative to the drive shafts. Whilst the use of a blade as shown in FIG. 5 is preferred, release elements having different shapes are also possible in accordance with the particular implementation of the overall apparatus.

Although the present invention has been described with respect to specific arrangements, it will be appreciated that other arrangements are also possible. For example, the spacing between the drive shafts on which the dispensing and wind-up rolls are mounted can be altered to provide the desired peel-back angle for the backing sheet. In addition, the drive shafts on which the rolls are mounted may be rotated in the same direction, either both clockwise, as described with reference to FIGS. 1 to 5 or both anticlockwise (not shown), or even in opposite directions as described above with reference to FIG. 6.

The invention claimed is:

1. A method of removing epoxy resin from a backing sheet in a housing, the method comprising the steps of:
   a) peeling back the backing sheet from the epoxy resin over a release element mounted in the housing; and
   b) collecting the epoxy resin adjacent the release element;
   wherein the method further comprises the step of adjusting the temperature of the epoxy resin in the housing to be at a temperature below the glass transition temperature of the epoxy resin; and
   wherein step a) comprises peeling the backing sheet from the epoxy resin through a peel-back angle greater than 0° and less than 180°.

2. A method according to claim 1, wherein the step of adjusting the temperature of the epoxy resin to be at a temperature below the glass transition temperature of the epoxy resin in the housing comprises blowing cold gas on the epoxy resin to cool it down just before it reaches the peel-back angle.

3. A method according to claim 2, wherein the step of adjusting the temperature of the epoxy resin in the housing to be at a temperature below the glass transition temperature of the epoxy resin comprises applying a gas to the epoxy resin in the housing to cool it down just before it reaches the peel-back angle.

4. A method according to claim 1, wherein step b) further comprises the step of weighing the epoxy resin collected.

5. A method according to claim 1, wherein step a) further comprises dispensing the epoxy resin and its backing sheet from a roll, the backing sheet being in contact with the release element.

6. A method according to claim 5, further comprising the step of winding up the backing sheet after peel-back.

7. A method according to claim 6, further comprising automating at least one of the steps of: dispensing the epoxy resin and its backing sheet from a roll; and winding up the backing sheet after removal of the epoxy resin.

8. A method according to claim 1, further comprising the step of applying a vacuum inside the housing during removal of the epoxy resin from the backing sheet.

9. A method according to claim 1, further comprising the step of scraping residual epoxy resin from the backing sheet after the backing sheet has been peeled back from the epoxy resin.

10. A method according to claim 1, further comprising the step of grounding the release element to prevent build-up of static electricity.

11. An apparatus for removing epoxy resin from a backing sheet, the apparatus comprising:
   a housing;
   a dispensing shaft on which a roll of epoxy resin coated backing sheet is mountable;
   a wind-up shaft on which a roll of backing sheet can be formed; and
   a collection tray;
   wherein the apparatus further comprises a release element for acting on the backing sheet to release the epoxy resin; the dispensing shaft, the wind-up shaft and the release element being arranged within the housing to provide a peel-back angle greater than 0° and less than 180°; and
   wherein the apparatus further comprises temperature control means configured for cooling the epoxy resin in the housing below its glass transition temperature to enable release of the epoxy resin from the backing sheet.

12. An apparatus according to claim 11, wherein the temperature control means is configured to maintain the temperature within the housing below the glass transition temperature of the epoxy resin.

13. An apparatus according to claim 11, wherein the temperature control means is further configured to introduce a cooling gas into the housing at a temperature below the glass transition temperature of the epoxy resin.

14. An apparatus according to claim 13, wherein the cooling gas comprises carbon dioxide at −80° C.

15. An apparatus according to claim 11, wherein the temperature control means is further configured to introduce a gas at a temperature below the glass transition temperature of the epoxy resin.

16. An apparatus according to claim 15, wherein the gas comprises air.

17. An apparatus according to claim 11, further comprising a drive mechanism for driving at least one of the dispensing shaft and the wind-up shaft.

18. An apparatus according to claim 17, wherein the dispensing shaft and the wind-up shaft are driven in the same direction.

19. An apparatus according to claim 17, wherein the dispensing shaft and the wind-up shaft are driven in opposite directions.

20. An apparatus according to claim 17, wherein the drive mechanism is automated.

21. An apparatus according to claim 11, further comprising at least one removal element located adjacent the release element.

22. An apparatus according to claim 11, further comprising a vacuum pump for applying a vacuum to the interior of the housing.

23. An apparatus according to claim 11, further comprising a balance for determining the weight of the collection tray.

* * * * *